(12) United States Patent
Matsumura et al.

(10) Patent No.: US 8,565,840 B2
(45) Date of Patent: Oct. 22, 2013

(54) COMMUNICATION TERMINAL, MOBILE COMMUNICATION SYSTEM AND COMMUNICATION METHOD

(75) Inventors: Takashi Matsumura, Kanagawa (JP); Tomohiro Miki, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 875 days.

(21) Appl. No.: 12/088,653

(22) PCT Filed: Sep. 29, 2006

(86) PCT No.: PCT/JP2006/319518
§ 371 (c)(1),
(2), (4) Date: Feb. 5, 2009

(87) PCT Pub. No.: WO2007/037402
PCT Pub. Date: Apr. 5, 2007

(65) Prior Publication Data
US 2009/0325622 A1 Dec. 31, 2009

(30) Foreign Application Priority Data
Sep. 29, 2005 (JP) .............................. P2005-285658

(51) Int. Cl.
*H04B 1/38* (2006.01)
*H04B 1/16* (2006.01)
*H04M 1/00* (2006.01)

(52) U.S. Cl.
USPC ................. 455/574; 455/343.2; 455/343.1; 455/552.1

(58) Field of Classification Search
USPC ............ 455/522, 68, 69, 127.1, 7, 574, 343.1
See application file for complete search history.

(56) References Cited

U.S. PATENT DOCUMENTS

| | | | |
|---|---|---|---|
| 6,201,977 B1 * | 3/2001 | Cathey et al. | 455/574 |
| 6,323,775 B1 * | 11/2001 | Hansson | 340/636.1 |
| 6,459,896 B1 * | 10/2002 | Liebenow | 455/425 |
| 6,532,375 B2 * | 3/2003 | Cathey et al. | 455/574 |
| 6,717,520 B1 * | 4/2004 | Dorenbosch | 340/636.1 |
| 6,735,417 B2 * | 5/2004 | Fonseca et al. | 455/11.1 |
| 7,012,910 B2 | 3/2006 | Takeuchi et al. | |
| 7,395,097 B2 * | 7/2008 | Perdomo et al. | 455/574 |
| 7,848,776 B2 * | 12/2010 | Akiba et al. | 455/552.1 |
| 7,957,775 B2 * | 6/2011 | Allen et al. | 455/572 |
| 2004/0033778 A1 * | 2/2004 | Fonseca et al. | 455/11.1 |
| 2005/0159111 A1 | 7/2005 | Kim et al. | |

FOREIGN PATENT DOCUMENTS

| | | | |
|---|---|---|---|
| JP | 2002171287 A | 6/2002 |
| JP | 2003069580 A | 3/2003 |
| JP | 2003229954 A | 8/2003 |
| JP | 2003309512 A | 10/2003 |
| JP | 2005198312 A | 7/2005 |

* cited by examiner

*Primary Examiner* — Tilahun B Gesesse
(74) *Attorney, Agent, or Firm* — DLA Piper LLP (US)

(57) ABSTRACT

A communication terminal performs first communication with a base station and second communication with an other terminal. The communication terminal detects a battery remaining amount, and is switchable from the first communication to the second communication according to the battery remaining amount. Selection of either the first communication or the second communication to be performed is triggered by receiving data from the base station.

2 Claims, 12 Drawing Sheets

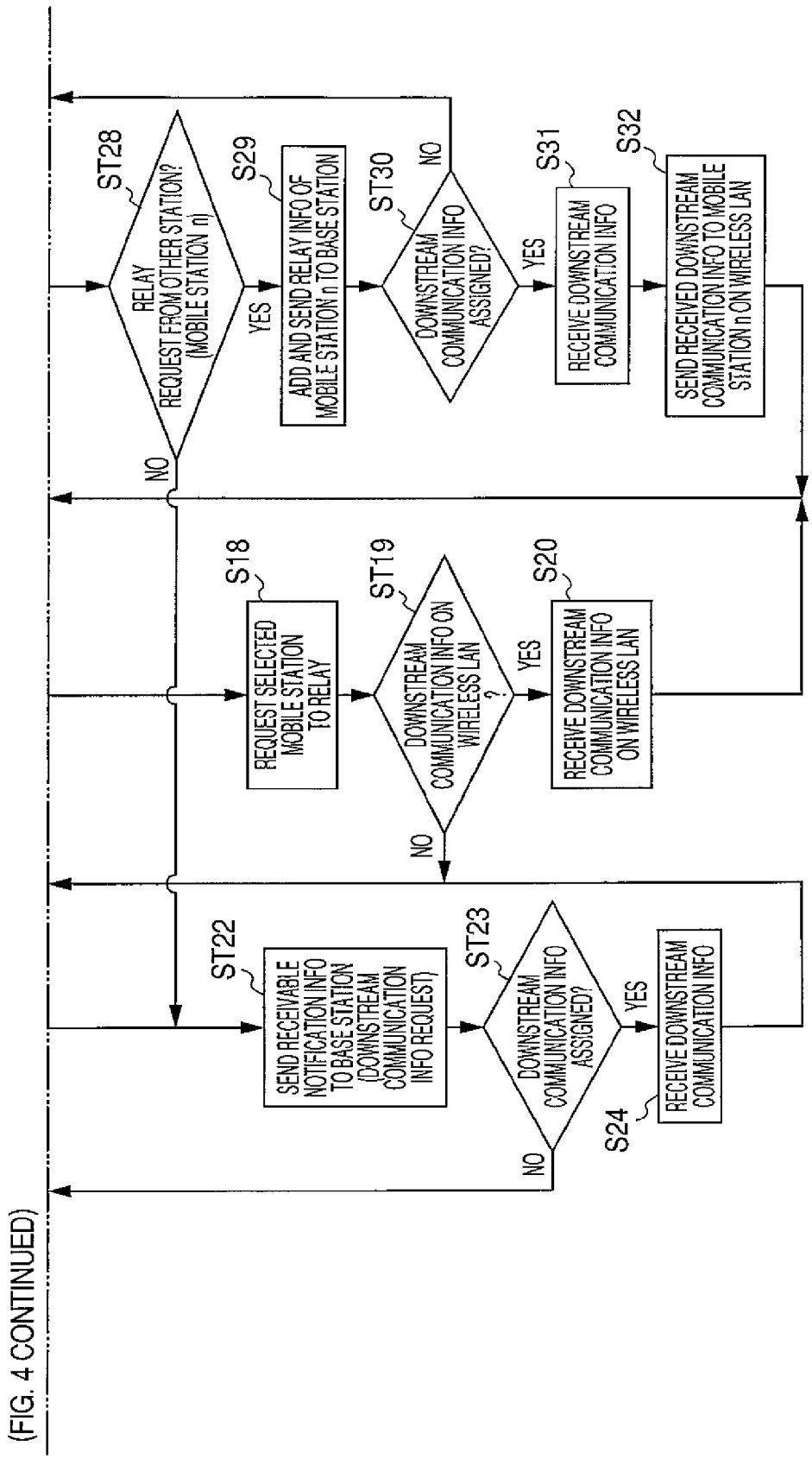

FIG. 5
| MAC ADDRESS | DRC |
|---|---|
| 6bit | 4bit |
FIG. 6
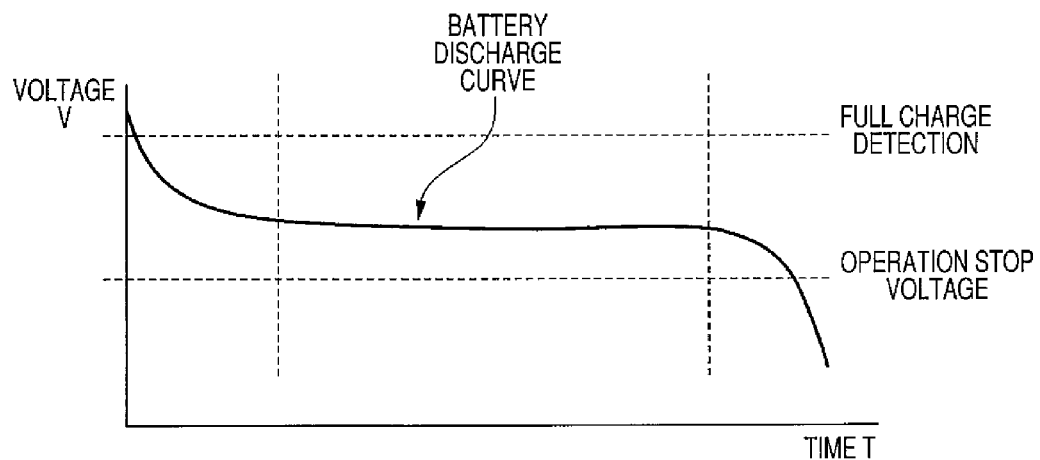
FIG. 7
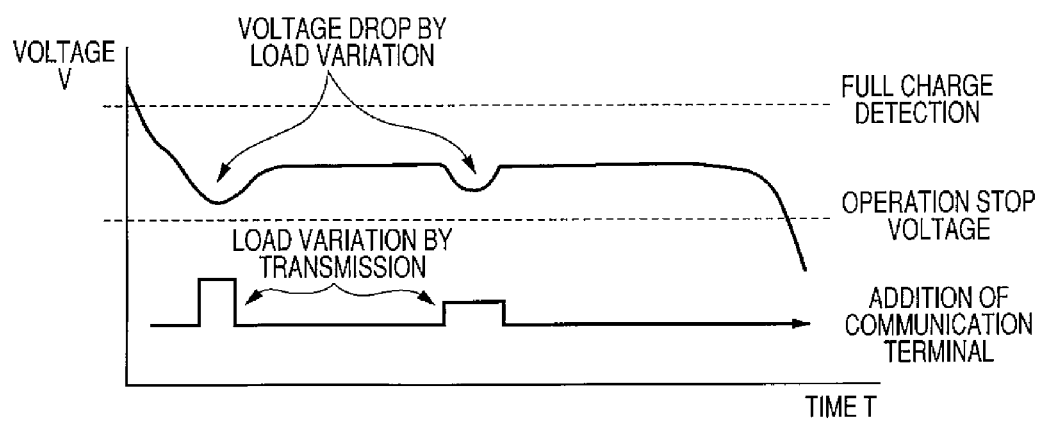

FIG. 8
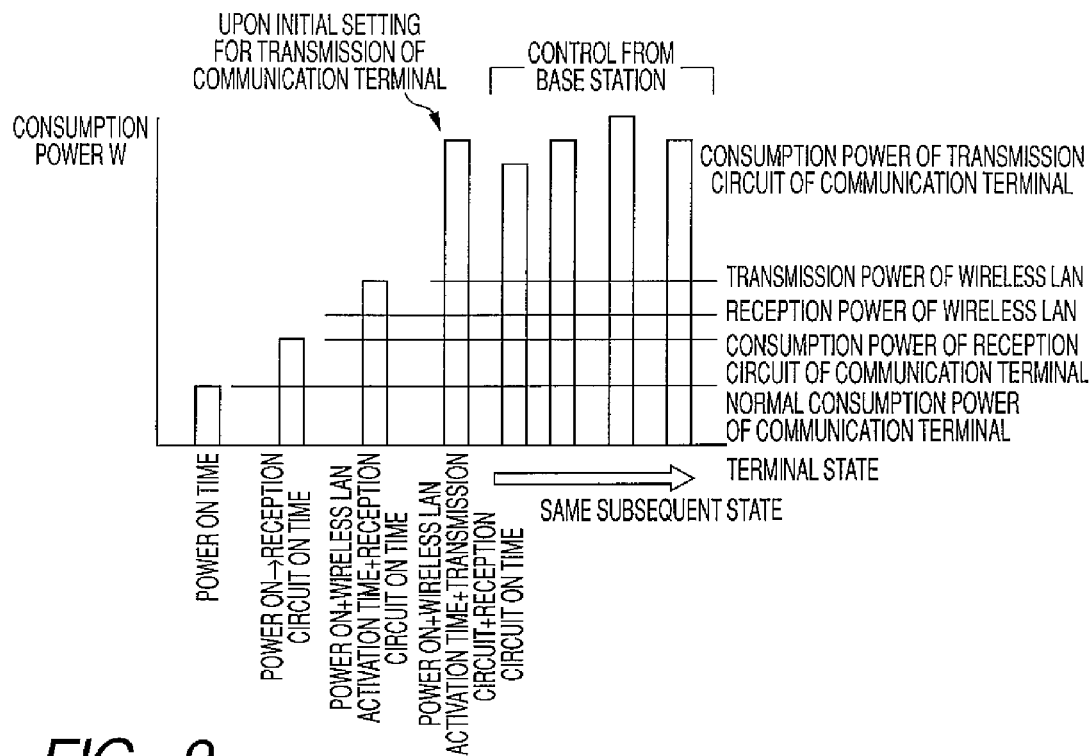
FIG. 9
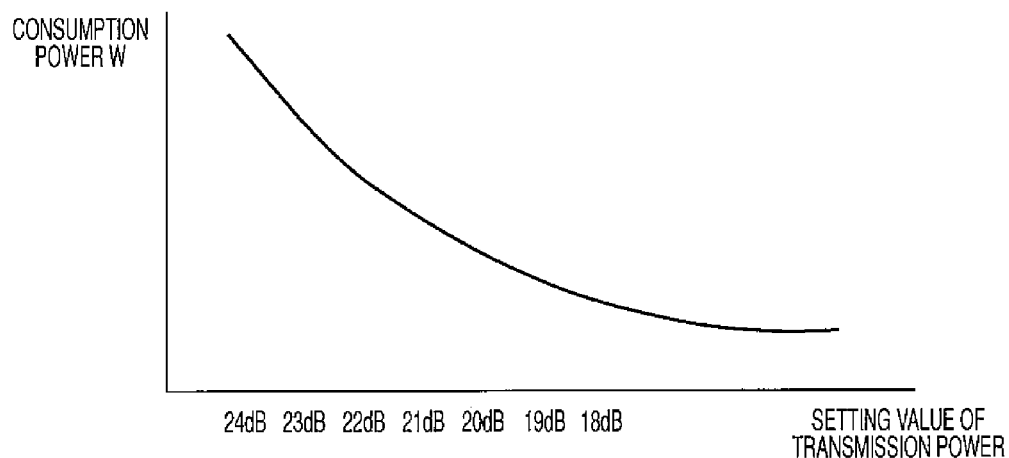
FIG. 10
| SETTING VALUE OF TRANSMISSION POWER | 24dB | 23dB | 22dB | 21dB | 20dB | 19dB | 18dB |
|---|---|---|---|---|---|---|---|
| VOLTAGE DROP | 0.45V | 0.35V | 0.28V | 0.22V | 0.16V | 0.14V | 0.11V |

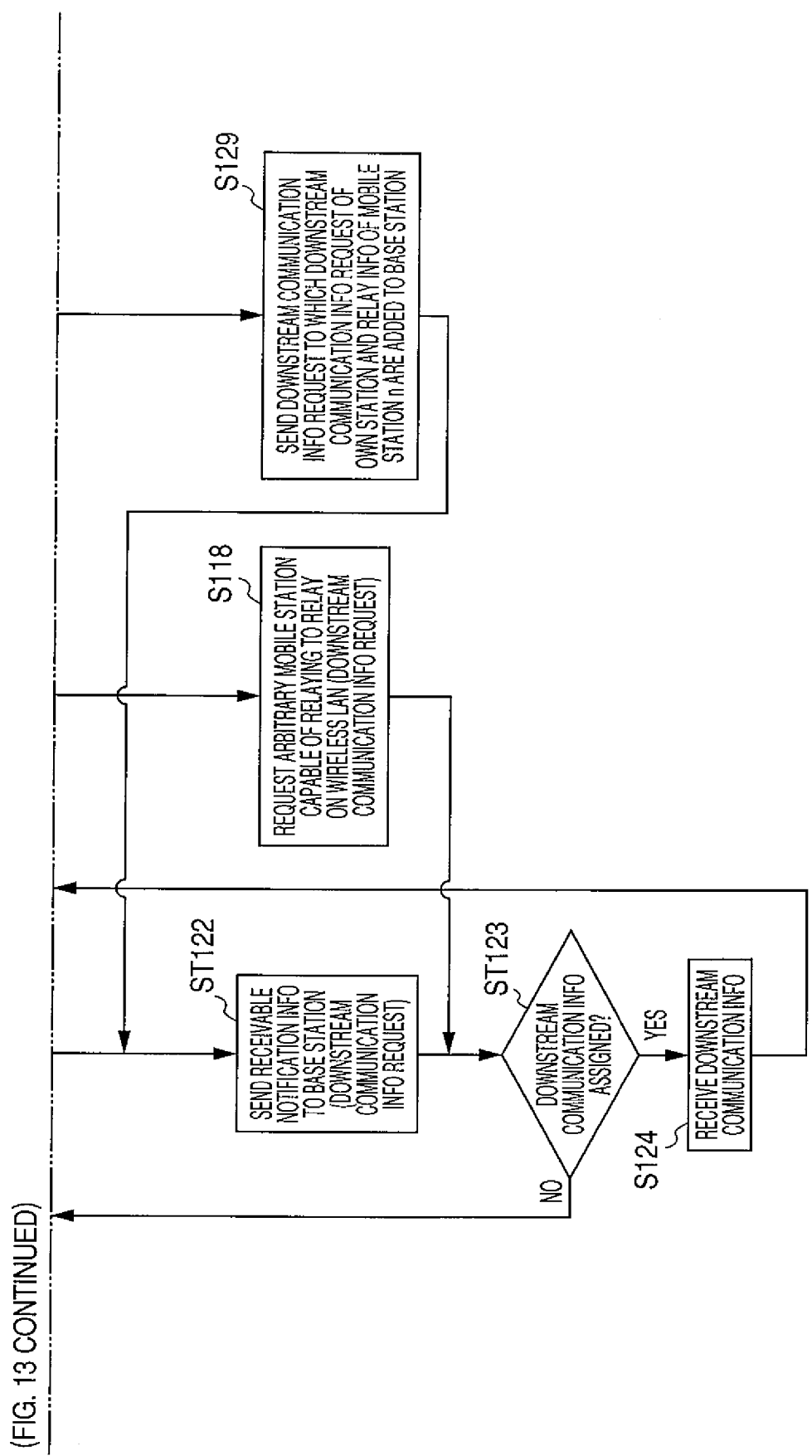

FIG. 14

| REPLY FLAG | MAC ADDRESS | DRC |
|---|---|---|
| 1bit | 6bit | 4bit |

COMMUNICATION TERMINAL, MOBILE COMMUNICATION SYSTEM AND COMMUNICATION METHOD

CROSS-REFERENCE TO THE RELATED APPLICATION

This application is a national phase of international application No. PCT/JP2006/319518 filed Sep. 29, 2006, the entire contents of which are incorporated by reference. This application also claims benefit of priority under 35 U.S.C. §119 to Japanese Patent Application No. 2005-285658 filed Sep. 29, 2005, the entire contents of which are incorporated by reference.

TECHNICAL FIELD

The present invention relates to a communication terminal requesting a base station to transmit downstream communication information on the basis of communication speed obtained according to a reception state of an own station, a mobile communication system having the same, and a communication method.

BACKGROUND ART

Conventionally, wireless communication systems (for example, CDMA2000 1xEV-DO and the like) for variably controlling downstream communication speeds (hereinafter, referred to as "downstream speeds") according to a reception state in a communication terminal are known.

These wireless communication systems are wireless communication techniques in which a tradeoff between downstream speed, and error resilience by a plurality of modulation techniques, spread rates, and the like is possible and a higher communication speed can be provided according to the reception state of the communication terminal.

A communication terminal in this wireless communication technique measures the quality (carrier to interference ratio (CIR)) of a reception signal from the base station and requests the base station to provide the highest downstream speed estimated for successful data reception at an error rate equal to or below a predetermined level.

On the other hand, in response to requests of downstream speeds received from a plurality of communication terminals, the base station performs communication by performing scheduling and determining a communication terminal to which downstream communication information is to be transmitted.

Although telecommunication carriers can employ any desired technique for this destination determination scheduling, a scheduling algorithm called proportional fair is commonly employed.

This scheduling is a technique for balancing fairness of communication speeds of a plurality of subscribers and a maximized total throughput in the overall base station, and calculates a past average communication amount R (using the moving average or logarithmic mean and, in general, corresponding to the average of traffic over the past one second) for each communication terminal to assign downstream communication information to a communication terminal exhibiting the maximum of DRC/R serving as a ratio of a required downstream communication speed (DRC) to the above-described average communication amount (R) (for example, see Patent Document 1).

In a wireless communication system in which communication terminals communicate with a base station, the communication terminal sets a transmission power according to a reception state from the base station when the communication terminal receives the reception state from the base station and performs transmission, and then the transmission power of the communication terminal is controlled by control from the base station.

On the other hand, in a wireless communication system in which communication terminals communicate with a base station, a communication technique in which communication of a communication terminal located outside a communication area of the base station and the base station is possible by using a communication terminal located within the communication area of the base station as a relay station is known (for example, see Patent Document 2).

Patent Document 1: Japanese Patent Application Publication No. 2002-171287
Patent Document 2: Japanese Patent Application Publication No. 2003-309512

DISCLOSURE OF THE INVENTION

Problem that the Invention is to Solve

However, in the wireless communication system disclosed in the above-mentioned Patent Document 1, the reception state of the communication terminal is bad when a distance between the base station and the communication terminal is large or an obstacle such as a high building or the like is present therebetween, such that a transmission power is maintained in a high state while the reception state is bad.

In this case, to send an upstream signal to the base station, a transmission power of several hundreds mW is required at a communication terminal side. Also in a section communicating with the base station, an upstream side requires a higher power than a downstream side in a downstream and an upstream.

Accordingly, in a communication terminal or apparatus operating at limited power of a battery or the like, there is a disadvantage in that communication with the base station may not be performed at the transmission power of several hundreds mW due to the degradation of power supply capacity.

In the above-mentioned case, in a short distance of from several tens to several hundreds m or a place where there is no obstacle, direct communication between terminals for which consumption power is low or downstream reception from the base station is only performed.

An object of the present invention is to provide a communication terminal capable of receiving communication information directed to an own station from a base station even when the own station has a small battery remaining amount and cannot transmit or receive directly to/from the base station, a mobile communication system having the same, and a communication method.

Means for Solving the Problem

According to a first aspect of the present invention, there is provided a communication terminal which is capable of first communication with a base station and second communication with other terminal, including: a detection section that detects a battery remaining amount, and a control section switchable from the first communication to the second communication according to the battery remaining amount.

There is provided a communication terminal in which wireless communication is mutually performed between an own station and another station and communication information directed to the own station is received via the other station, including: a relay request that, in a case where the own station communicates with a base station, receives relay enable information transmitted from the other station, and makes a relay request for communication between the own station and the other station from the own station to the base station when a battery remaining amount of the own station is lower than a predetermined threshold value.

Preferably, there is provided a transmission and reception section that transmits identification information for the base station to identify any of the own station or the other station to the base station via the other station and receives communication information directed to the own station transmitted by the base station on a basis of the identification information of the own station via the other station.

Preferably, there is provided a relay execution section that, in a case where no communication directed to the own station exists, transmits a relay enable flag from the own station to the other station if a battery remaining amount of the own station is more than a predetermined threshold value, and relays and transmits, to the other station, communication information directed to the other station transmitted by the base station on a basis of identification information of the other station when the other station requires relaying.

According to a second aspect of the present invention, there is provided a communication terminal in which wireless communication is mutually performed between an own station and another station and a transmission request of downstream communication information directed to the own station is transmitted via the other station, including: a relay request section that, in a case where the own station communicates with a base station, requests the other station capable of relaying to relay a transmission request of downstream communication information by a relay request of the own station if a value based on a battery remaining amount of the own station is less than a specific threshold value.

According to a third aspect of the present invention, there is provided a communication terminal in which wireless communication is mutually performed between an own station and another station, a transmission request of downstream communication information directed to the own station is transmitted via the other station, and communication information directed to the own station is received via the other station, including: a relay request section that requests the other station capable of relaying to relay one or both of downstream communication information directed to the own station and a transmission request of the downstream communication information directed to the own station by a relay request of the own station according to reception states of the own station and the other station and whether a battery remaining amount of the own station is less than a specific threshold value.

According to a fourth aspect of the present invention, there is provided a mobile communication system comprising: a plurality of communication terminals that perform wireless communication between an own station and other station; and a base station that is requested to transmit downstream communication information according to a reception state of the communication terminals. In the mobile communication system, the communication terminals comprises an other-station relay request section that receives relay setting information and a battery remaining amount obtained from the other station, and requests the other station to relay communication information directed to the own station by transmitting identification information for the base station to identify any of the own station or the other station when the battery remaining amount of the other station is large, and the base station comprises an own/other-station identification transmission section that transmits communication information of the own station to the communication terminal of the own station via the communication terminal of the other station on a basis of the identification information of the own station.

Preferably, the base station includes: a scheduling section that determines a transmission sequence and a transmission amount to the communication terminal on a basis of the communication speed to a past communication amount of the communication terminal, and a communication amount correction section that handles the communication information transmitted to the communication terminal having relayed as that transmitted to the communication terminal having requested relaying when the past communication amount of the communication terminal is computed.

Preferably, the communication amount correction section subtracts a communication amount according to the communication information transmitted to the communication terminal having relayed from a past communication amount of the communication terminal having relayed, and adds the communication amount to a past communication amount of the communication terminal having requested relaying.

Preferably, the communication terminals mutually perform wireless communication between an own station and another station, transmit a transmission request of downstream communication information directed to the own station via the other station, and relay the transmission request of downstream communication information directed to the other station from the other station, wherein at least one communication terminal of the plurality of communication terminals capable of wireless communication relays and transmits a transmission request of downstream communication information destined for the plurality of communication terminals to the base station.

Preferably, when the at least one communication terminal is selected from the plurality of communication terminals, a terminal whose battery remaining amount is largest is selected from among the plurality of communication terminals.

Preferably, when the at least one communication terminal is selected from the plurality of communication terminals, a communication terminal capable of relaying is randomly selected from among the plurality of communication terminals.

According to a fifth aspect of the present invention, there is provided a communication method which allows first communication with a base station and second communication with another terminal, including: detecting a battery remaining amount, and switching from the first communication to the second communication according to the battery remaining amount.

According to a sixth aspect of the present invention, there is provided a communication method in which wireless communication is mutually performed between an own station and another station and communication information directed to the own station is received via the other station, including: receiving relay enable information transmitted from the other station when the own station communicates with a base station, and making a relay request for communication between the own station and the base station from the own station to the other station when a battery remaining amount of the own station is less than a predetermined threshold value.

According to a seventh aspect of the present invention, there is provided a communication method in which wireless communication is mutually performed between an own station and another station and a transmission request of downstream communication information directed to the own station is transmitted via the other station, including: requesting the other station capable of relaying to relay a transmission request of downstream communication information by a relay request of the own station if a value based on a battery remaining amount of the own station is less than a specific threshold value when the own station communicates with a base station.

Advantage of the Invention

The present invention can improve the reduction of a communication time of an own station due to the reduction of a battery remaining amount and enhance a user's convenience, by setting a communication terminal, having relay setting information of another station in relay setting information of the own station and the other station, to a relay station among a plurality of communication terminals located in a range in which mutual communication is possible.

BRIEF DESCRIPTION OF THE DRAWINGS

FIG. 5 is a view showing an example of an extended DRC frame to which a MAC address is attached.
FIG. 6 is a view showing an example of a discharge curve of a battery of a communication terminal.
FIG. 7 is a view showing an example of a voltage drop due to load variation according to transmission in a discharge curve of a battery of a communication terminal.
FIG. 8 is a view showing an example of consumption power to an operation state of a communication terminal.
FIG. 9 is a view showing an example of a relationship of a transmission power and consumption power of a communication terminal.
FIG. 10 is a view showing an example of a relationship of a transmission power and a battery voltage drop of a communication terminal.
FIG. 12 is a flowchart showing a communication operation of a communication terminal.
FIG. 14 is a view showing an example of a downstream communication information transmission request in a relay request on a wireless LAN.

Figure 1:
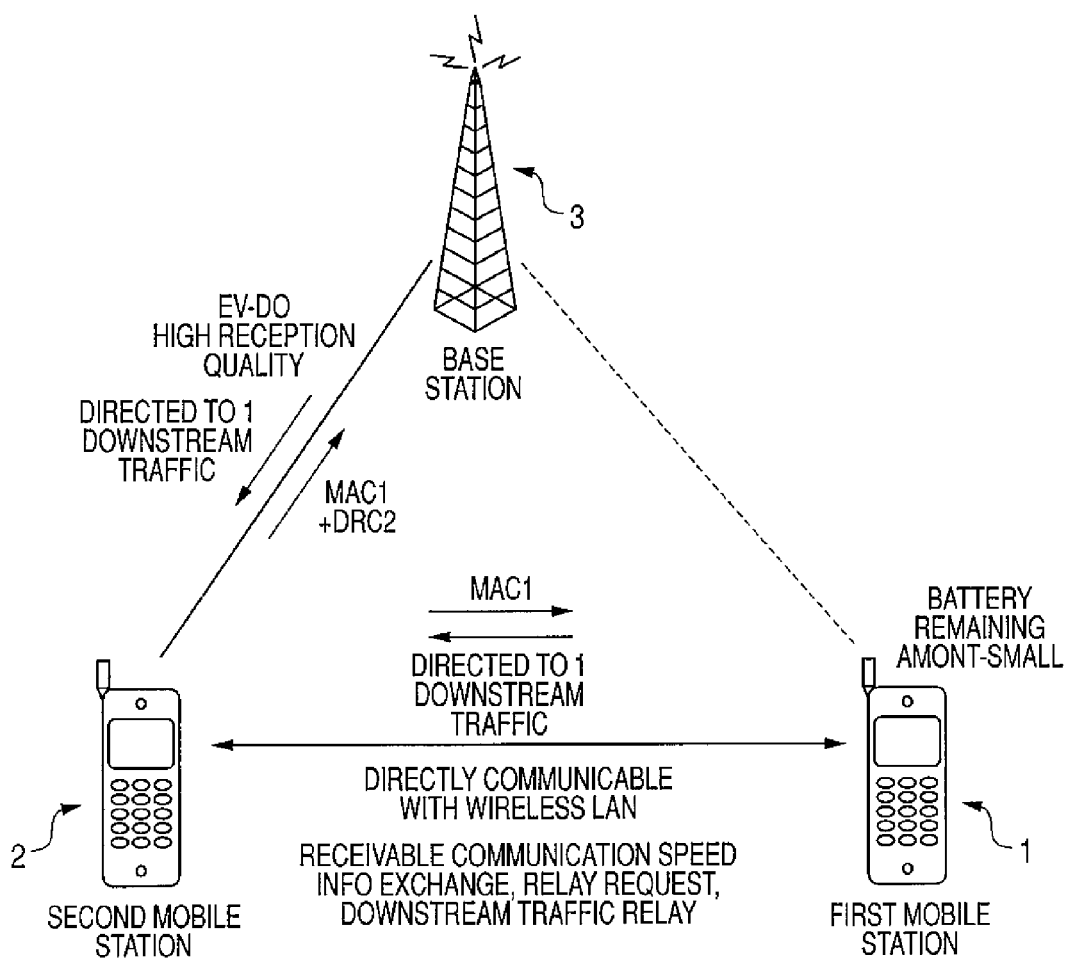
FIG. 1 is a view showing a positional relationship of a base station and communication terminals.

DESCRIPTION OF REFERENCE NUMERALS AND SIGNS 1, 2: COMMUNICATION TERMINAL (MOBILE COMMUNICATION TERMINAL)
3: BASE STATION
10, 11: ANTENNA
12: BASE STATION TRANSCEIVER
13: WIRELESS LAN TRANSCEIVER
14: VOICE PROCESSING SECTION
15: TRANSMITTER
16: RECEIVER
17: SCREEN DISPLAY SECTION
18: OPERATION KEY
19: BATTERY REMAINING AMOUNT MEASUREMENT SECTION
20: STORAGE SECTION
21: CONTROL SECTION
22: RECEPTION QUALITY MEASUREMENT/COMMUNICATION SPEED COMPUTATION SECTION
23: THRESHOLD VALUE SETTING PROCESSING SECTION
24: INTER-TERMINAL INFORMATION EXCHANGE SECTION
25: COMMUNICATION TERMINAL SELECTION SECTION
31: SCHEDULER
32: OWN/OTHER-STATION IDENTIFICATION TRANSMISSION SECTION
33: COMMUNICATION AMOUNT CORRECTION SECTION

BEST MODE FOR CARRYING OUT THE INVENTION

Hereinafter, a communication terminal and a mobile communication system according to one embodiment of the present invention will now be described with reference to the drawings.

First, an overall configuration of the system will be described with reference to FIG. 1.

FIG. 1 shows a positional relationship among a base station 3, a mobile communication terminal 1 (hereinafter, referred to as a communication terminal) of an own station, and a communication terminal 2 of another station.

Herein, in the following description in an example of a mobile communication system employing a communication technique (for example, CDMA2000 1xEV-DO technique) for controlling the transmission power of a terminal according to a reception state of a communication terminal, it is described that the communication terminal 1 of the own station is in a state in which a battery remaining amount is reduced and the communication terminal 2 of the other station has a sufficient battery remaining amount.

The communication terminals 1, 2 shown in FIG. 1 have a communication function capable of performing direct communication therebetween, without passing through an access point, using ad-hoc mode corresponding to one of the communication techniques of a relatively short distance, such as WiFi or WiMAX of a wireless LAN or the like.

Although only two communication terminals 1, 2 are shown in FIG. 1, the number of communication terminals is not limited thereto and can be three or more.

The communication terminals 1, 2 of this embodiment can perform first communication with the base station 3 and second communication with another terminal, and have a detection function for detecting a battery remaining amount and a function for switching from the first communication to the second communication according to the battery remaining amount.

Herein, terms used in the specification and claims are defined.

The own station and the other station are logical names referring to a state in which a communication terminal is placed. The own station is a communication terminal in a state in which the battery remaining amount is relatively reduced and the other station is a communication terminal in a state in which the battery remaining amount is sufficient.

Basically, the own station is a communication terminal that requests the other station to relay downstream communication information, and the other station is a communication terminal that receives a relay request from the own station and relays the downstream communication information from the base station 3 to the own station.

Therefore, the own station needs to include at least a relay request section for requesting the other station to relay, and the other station needs to include at least a relay execution section for relaying downstream communication information to the own station.

In the example shown in FIG. 1, the communication terminal 2 corresponds to the other station, and the communication terminal 1 corresponds to the own station, but the two communication terminals 1, 2 include both the relay request section and the relay execution section. When the battery remaining amount of the communication terminal 1 is sufficient and the battery remaining amount of the communication terminal 2 is lowered, the communication terminal 2 is the own station and the communication terminal 1 is the other station.

The reception state refers to the quality (carrier to interference ratio (CIR)) of a signal received from the base station at a communication terminal.

The battery remaining amount is an available remaining amount of a battery serving as a power supply that is embedded in a communication terminal and enables the operation of the communication terminal, and enables a remaining communicable time or the like to be estimated by a predetermined table or the like from a stop voltage serving as a lower limit voltage of a dischargeable voltage and a relative value of a battery voltage.

The communication information refers to traffic data. The transmission request includes identification information (MAC address) of the own station and a communication speed of the other station, and is that in which the own station requests the base station to transmit downstream communication information via the other station.

Next, the configurations of the communication terminal 1 and the base station 3 shown in FIG. 1 will be described with reference to FIG. 2. Since the configuration of the communication terminal 2 shown in FIG. 1 is similar to that of the communication terminal 1, a detailed description is omitted.

Figure 2:
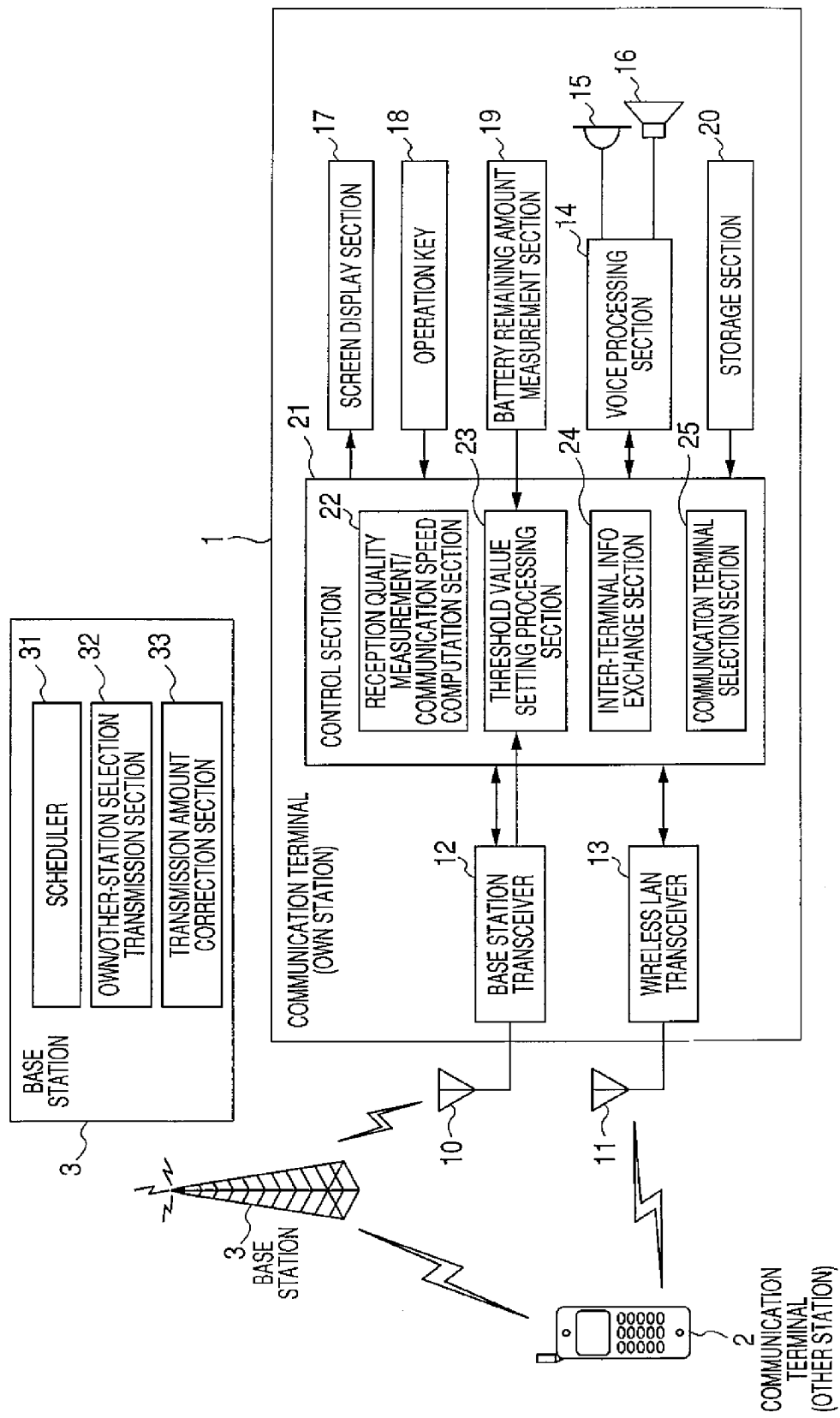
FIG. 2 is a view showing a configuration example of a mobile communication system according to the present invention.

FIG. 2 is a block diagram showing the configurations of the communication terminal 1 and the base station 3 shown in FIG. 1.

As shown in FIG. 2, the communication terminal 1 has antennas 10, 11, a base station transceiver 12, a wireless LAN transceiver 13, a voice processing section 14, a transmitter 15, a receiver 16, a screen display section 17, an operation key 18, a battery remaining amount measurement section 19, a storage section 20, and a control section 21. The control section 21 includes a reception quality measurement/communication speed computation section 22, a threshold value setting processing section 23, an inter-terminal information exchange section 24, and a communication terminal selection section 25.

As shown in FIG. 2, the base station 3 includes a scheduler 31, an own/other-station identification transmission section 32, and a communication amount correction section 33.

In FIG. 2, the base station transceiver 12 is a circuit in which the communication terminal 1 performs transmission and reception processing to and from the base station 3 under control of the control section 21, and the antenna 10 is connected to the base station transceiver 12.

The wireless LAN transceiver 13 is a circuit for performing transmission and reception processing to and from the communication terminal of the other station (the communication terminal 2 in this example) under the control of the control section 21, and the antenna 11 is connected to the wireless LAN transceiver 13.

The control section 21 controls the base station transceiver 12, the screen display section 17, the operation key 18, and the voice processing section 14 to carry out call processing in voice communication, transmission and reception processing of electronic mail or the like, and controls communication processing with the communication terminal of the other station in the wireless LAN transceiver 13. The transmitter 15 and the receiver 16 are connected to the voice processing section 14.

The control section 21 is a main function section for realizing the function of the present invention, and is configured from the reception quality measurement/communication speed computation section 22, the threshold value setting processing section 23, the inter-terminal information exchange section 24, the communication terminal selection section 25 and the like as described above. Moreover, the control section 21 is connected to the battery remaining amount measurement section 19 and the storage section 20.

The reception quality measurement/communication speed computation section 22 receives a downstream pilot signal from the base station 3 to measure the reception quality (CIR), and performs a process for predicting/determining a maximum data rate (communication speed) at which the own station can receive downstream traffic data from the base station at a predetermined error rate (usually 1%) or less from the reception quality.

The threshold value setting processing section 23 acquires a battery remaining amount from the battery remaining amount measurement section 19 and computes a threshold value from threshold value data in the storage section 20 and a transmission power obtained in the base station transceiver 12, and determines whether to request the other station to relay communication between the own station and the base station by comparing the battery remaining amount and the threshold value.

The inter-terminal information exchange section 24 performs a process for setting up communication paths with the base station and the other station in reception and transmission and exchanging information with the other station, transmits whether relaying is possible, a battery voltage when relaying is possible, a reception quality, or a predicted data rate to the other station, and receives relay enable information including a battery remaining amount, a reception quality, or the like from the other station.

The communication terminal selection section 25 compares the battery remaining amount of the own station and the battery remaining amount of the other station to select the own station or the other station as a relay station from the battery remaining amount of the own station and the battery remaining amount obtained from the other station, and determines the own station of the highest voltage or one of communication terminals of other stations capable of relaying. The storage section 20 stores programs, data and the like to be executed by the control section 21 and is used to save received data.

The control section of the base station 3 is configured from a scheduler 31, an own/other-station identification transmission section 32, a communication amount correction section 33, and the like.

The scheduler 31 performs a process for determining a transmission sequence of downstream traffic data (communication information), an amount of transmission, and the like based on a "required amount of transmission (or required speed) with respect to the average of past communication traffic (calculated over a predetermined period or according to a predetermined algorithm)," for example, in Proportional Fair or the like.

The own/other-station identification transmission section 32 performs a process for receiving a transmission request including the identification information of the own station from the communication terminal 2 of the other station, referring to the identification information of the communication terminal 1 of the own station having requested relaying from its header information, and transmitting downstream traffic data (communication information) to the communication terminal 1 of the own station via the communication terminal 2 of the other station having relayed.

When a past communication amount sent to each communication terminal is to be computed, the communication amount correction section 33 handles downstream traffic data transmitted to the communication terminal having relayed (the communication terminal 2 of the other station) as that transmitted to the communication terminal having requested relaying (the communication terminal 1 of the own station).

Specifically, the communication amount correction section 33 performs a process for subtracting the above-described communication amount (relayed communication amount) from the past communication amount of the communication terminal 2 of the other station having relayed and adding the above-described communication amount (communication amount relayed by the other station) to the past communication amount of the communication terminal 1 of the own station having requested relaying.

Figure 3:
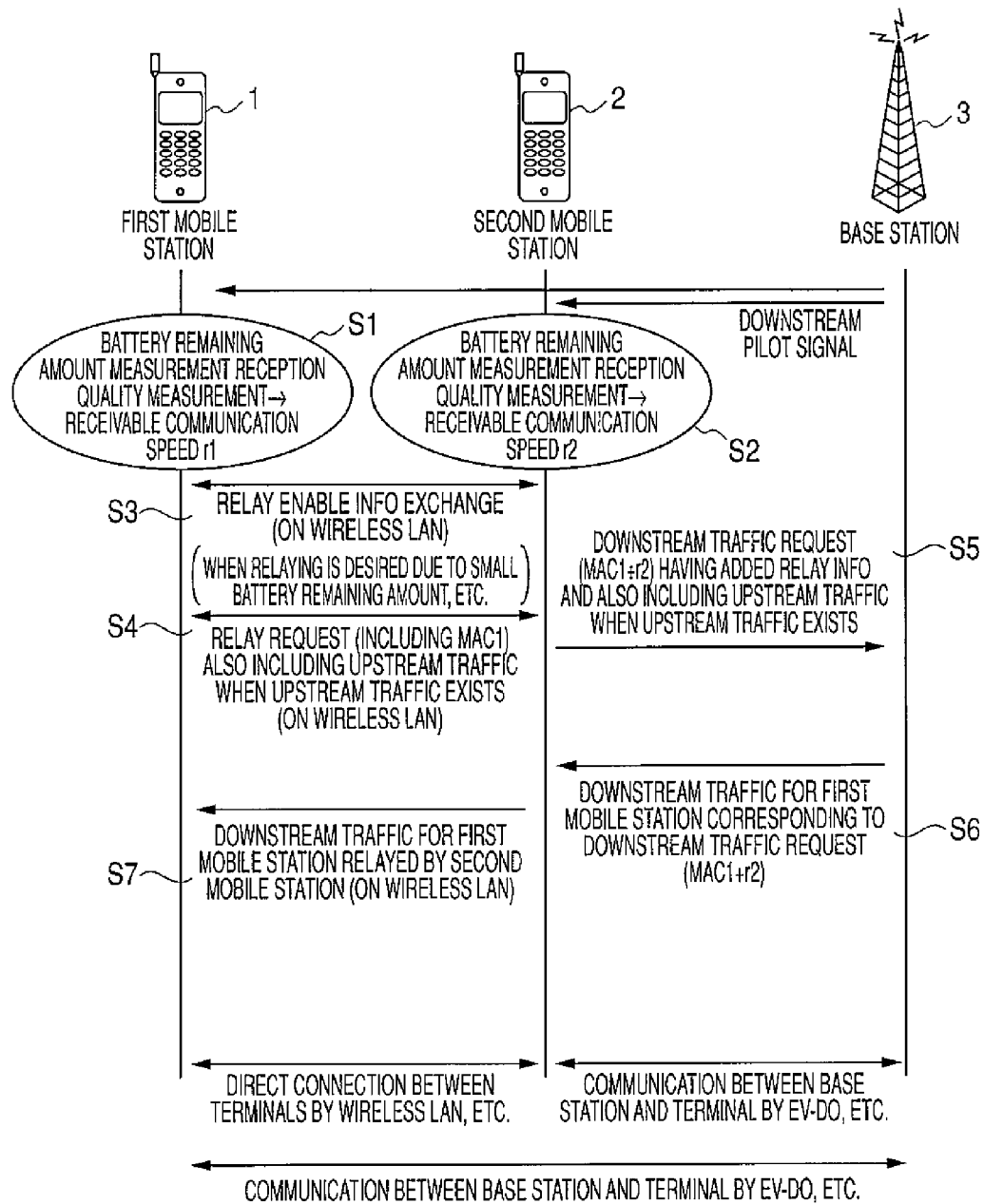
FIG. 3 is a view showing a communication operation between stations.

FIG. 3 is a view showing a communication operation between stations. Hereinafter, the communication operation among the two communication terminals 1, 2 and the base station 3 will be described with reference to FIG. 3.

Herein, it is described that the communication terminal 1 of the own station is in a state in which downstream traffic data needs to be received from the base station 3 and the communication terminal 2 of the other station is located within a communication area of the base station 3 but the communication terminal 2 itself is in a state in which downstream traffic data does not need to be received.

First, the communication terminal 1 receives a downstream pilot signal from the base station 3, measure a reception state, compute a receivable downstream communication speed r1, and measure a battery remaining amount (step S1).

Then, the communication terminal 2 also receives a downstream pilot signal from the base station 3, measures a reception state, computes a receivable downstream communication speed r2, and measures a battery remaining amount (step S2).

Then, the communication terminal 1 and the communication terminal 2 basically mutually exchange relay enable information including the receivable downstream communication speeds r1, r2, battery remaining amounts, but the communication terminal 1 only receives the relay enable information of the other station from the communication terminal 2 without transmitting the relay enable information of the own station to the communication terminal 2 since the communication terminal 1 is not in a state in which relaying is possible (step S3).

Upon determining that the battery remaining amount in the communication terminal 1 is less than the threshold value, a relay request including a MAC address (identification information) of the communication terminal 1 is sent from the communication terminal 1 to the communication terminal 2 (step S4).

Herein, the MAC address is an address (code) for identifying each communication terminal communicating with the base station 3 in the EV-DO technique.

When receiving the relay request from the communication terminal 1, the communication terminal 2 transmits a downstream traffic request (transmission request) to which the MAC address (relay information) has added to the base station 3 (step S5).

The base station 3 transmits "downstream data for the communication terminal 1" to the communication terminal 2 (step S6).

Upon receiving this, the communication terminal 2 relays and transmits the "downstream traffic data for the communication terminal 1" received from the base station 3 to the communication terminal 1 via the wireless LAN (step S7).

Next, an internal processing operation of the communication terminal 1 will be described in detail with reference to FIG. 4.

Figure 4:
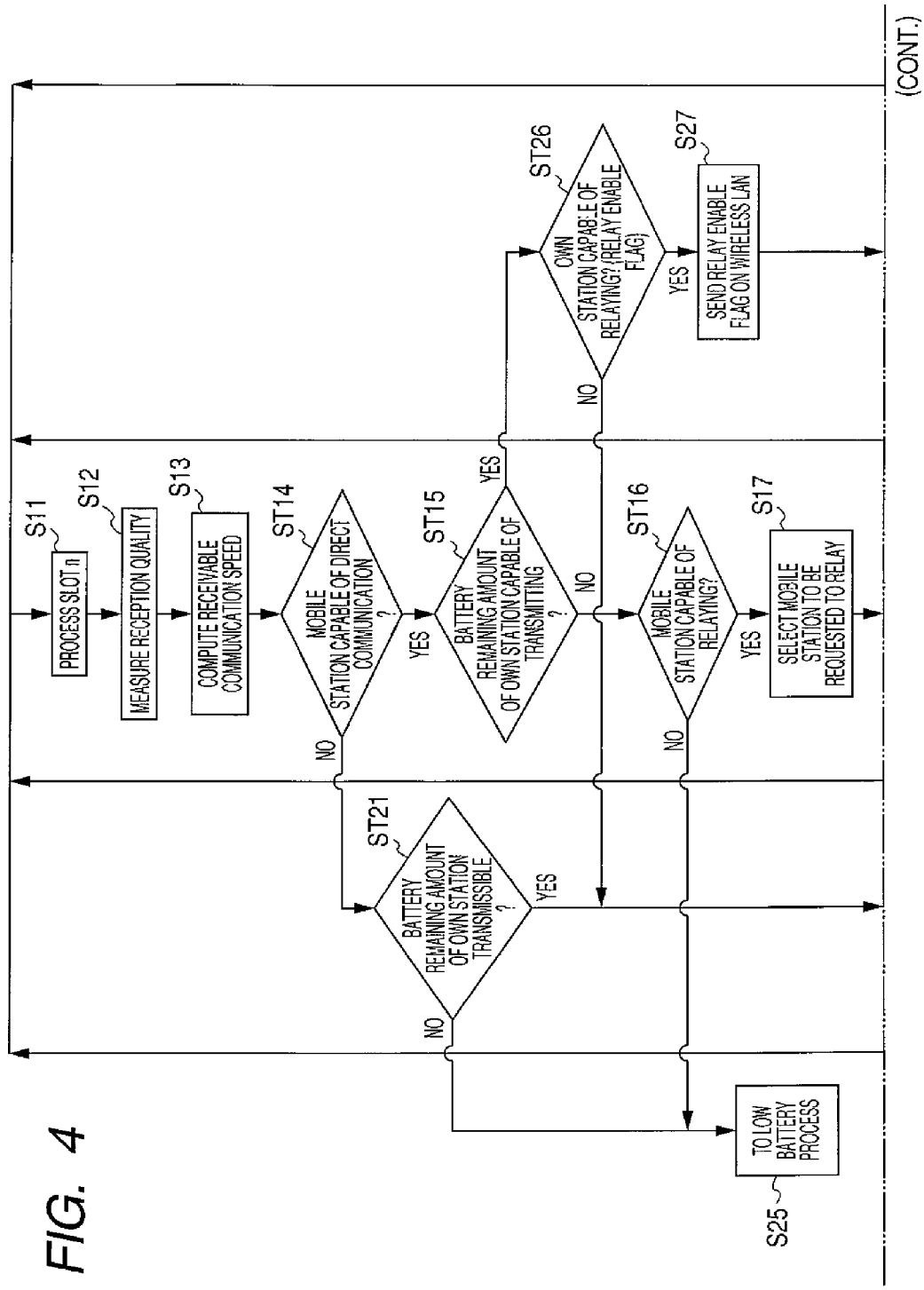
FIG. 4 is a flowchart showing a communication operation of a communication terminal.

FIG. 4 is a flowchart showing the operation of the communication terminal 1. The flowchart shown in FIG. 4 shows the processing operation when the communication terminal 1 includes both the relay request section and the relay execution section.

First, a process of a slot n is initiated in the communication terminal 1 (step S11). According to a downstream pilot signal from the base station 3, the communication terminal 1 measures a reception state (step S12) and computes a receivable communication speed (step S13).

Next, the communication terminal 1 determines whether the communication terminal 2 of another station capable of direct communication by the wireless LAN exists (step S14).

Upon determining that no communication terminal 2 of the other station capable of direct communication by the wireless LAN exists in step S14, the battery remaining amount of the communication terminal 1 serving as the own station is measured, the threshold value is computed according to the reception state and the transmission power determined according to the control from the base station, and it is determined whether the transmission by the own station is possible by comparing the battery remaining amount and the threshold value (step S21).

Since other station capable of being requested to relay is not present upon determining that the transmission by the own station is impossible in step S21, it is no more possible to communicate with the base station and the transition to a low battery process (step S25) is made.

Herein, the low battery process includes the termination of communication with the base station and indicates the transition to notification for a user and automatic power off of the communication terminal or non-communication mode without power off (mode in which only a function operable even in a low battery remaining amount state other than a communication function among communication terminal functions is enabled), but it is possible to return to the first step S11 in expectation that a mobile station in which direct communication is possible will appear.

Upon determining that the transmission by the own station is possible in step S21, receivable downstream communication speed information is included and transmitted to the base station 3 and a request for transmission of downstream traffic data (communication information directed to the own station) is made (step S22).

Then, when the downstream traffic data is assigned, the downstream traffic data is received from the base station 3 (steps S23, S24) and the return to the first step S11 is made. Even when the downstream traffic data is not assigned, the return to the first step S11 is made.

On the other hand, upon determining that the communication terminal 2 of the other station capable of direct communication, for example, represented by the wireless LAN, exists in step S14, the communication terminal 1 measures the battery remaining amount of the own station and computes the threshold value according to the reception state and the transmission power determined by the control from the base station, and determines whether the transmission by the own station is possible by comparing the battery remaining amount and the threshold value (step S15).

Upon determining that the transmission by the own station is impossible in step S15, it is determined whether the communication terminal 2 capable of relaying exists (step S16). The determination of whether the communication terminal 2 capable of relaying is performed exists according to whether a communication terminal capable of communication in ad-hoc mode on the wireless LAN exists.

Upon determining that the communication terminal 2 capable of relaying is absent in step S16, the transition to the low battery process (step S25) is made. Upon determining that the communication terminal 2 capable of relaying exists in step S16, relay enable flags including a battery remaining amount and a receivable downstream communication speed are received from the communication terminal 2 capable of relaying on the wireless LAN and a communication terminal to be requested to relay is selected (step S17). Herein, a selection method will be described below when a plurality of communication terminals capable of relaying exist.

The communication terminal 1 requests the communication terminal 2 selected in step S17 to relay on the wireless LAN (step S18). Then, it is determined whether downstream traffic data on the wireless LAN exists (step S19). If so, the downstream traffic data on the wireless LAN is received (steps S20, S21) and the return to the first step S11 is made. Even when the downstream traffic data is not assigned, the return to the first step S11 is made.

On the other hand, it is determined whether the own station can relay upon determining that the transmission by the own station is possible in step S15 (step S26). Herein, about whether the own station can relay, relaying is possible in a state in which the own station does not need to receive downstream communication information from the base station, that is, continuous communication is not performed, and relaying is impossible when the own station is in communication.

Upon determining that relaying is impossible, that is, the own station is in communication, in step 26, the transition to step S22 is made to request the base station to transmit downstream communication information. Upon determining that the own station can relay in step S26, relay enable flags including a battery remaining amount and a receivable downstream communication speed are transmitted to the communication terminal of the other station on the wireless LAN (step S27).

Then, it is determined whether a relay request from a communication terminal n of other station exists (other station requesting the own station to relay) (step S28). When no relay request exists, the transition to step S22 is made.

When the relay request exists, relay information including a MAC address serving as identification information of the communication terminal n included in the relay request is added, and the receivable downstream communication speed of the own station is transmitted to the base station 3 (step S29).

Then, the communication terminal 1 determines whether downstream traffic data is assigned (step S30). When the downstream traffic data is assigned, the downstream traffic data is received (step S31) and the received downstream traffic data is transmitted to the communication terminal n on the wireless LAN (step S32).

Upon determining that the downstream traffic data is not assigned in step S30, the return to the first step S11 is made.

When the communication terminal 1 requests the communication terminal 2 to relay, the communication terminal 1 requests the communication terminal 2 to relay downstream traffic data directed to the own station using the wireless LAN, and the communication terminal 2 of the other station makes a transmission request to the base station 3 by including and adding a receivable downstream communication speed of the other station (communication terminal 2 itself) to the base station 3 and identification information (MAC address) of the communication terminal (own station) as header information according to this request.

FIG. 5 is a view showing an example of an extended DRC to which a MAC address is added.

A MAC address (6 bits) of the communication terminal 1 requesting relaying is included as header information, and 4 bits of a DRC symbol on a DRC subchannel is extended and transmitted on an upstream data channel from the communication terminal 2 to the base station 3. A method for carrying MAC address information by puncturing part of the DRC subchannel or carrying MAC address information by puncturing part of a pilot subchannel can be used.

The above example has been described focusing on the case where only one communication terminal 2 exists serving as the other station capable of relaying other than the communication terminal 1 serving as the own station, but one communication terminal to be requested to relay needs to be selected from among a plurality of other stations when a plurality of communication terminals serving as other stations capable of relaying exist.

The selection is performed in the communication terminal selection section 25 of the control section 21, and a configuration in which other station having a largest battery remaining amount is selected as a communication terminal to be requested to relay by comparing battery remaining amounts of respective terminals obtainable from a plurality of other stations is described in the above-mentioned example.

In another embodiment of the present invention, the best other station can be selected as a communication terminal to be requested to relay by comparing reception states of respective terminals obtainable from a plurality of other stations or data rates obtained when requesting a corresponding station to relay instead of comparing the battery remaining amounts. This case can increase the throughput of downstream communication information directed to the own station from the base station via a relay terminal that can be obtained as a result of the relay request.

In a further embodiment of the present invention, a disadvantage to be suffered by a communication terminal when only a specific communication terminal relays can be reduced in terms of battery consumption, by randomly selecting other station capable of relaying in the communication terminal selection section 25.

The computation of a battery remaining amount and a threshold value in the threshold value setting processing section 23 will be described with reference to FIGS. 6 to 10.

FIG. 6 is a view showing a discharge curve of a lithium-ion secondary battery voltage generally used in a communication terminal. In FIG. 6, the vertical axis is a voltage and the horizontal axis is a time. In a given load state in FIG. 6, a state in which a given voltage is discharged and stable is assumed.

The communication terminal sets a full charge voltage and an operation stop voltage from a voltage of a discharge curve.

When the communication terminal operates, power is consumed and a battery voltage is lowered by supplying its power from the battery.

A state in which the battery voltage is lowered to the operation stop voltage is that in which a battery remaining amount is zero. In a state in which the battery remaining amount is large at a level at which the battery voltage is close to the full charge voltage, a difference between the battery voltage and the operation stop voltage can be used as a measure of the battery remaining amount.

On the other hand, various states exist such as a standby state or a talk state as an operation of the communication terminal, an operation state by a user, and the like, but their consumption currents are different and their voltage reduction amounts per time are different. For this reason, a time in which the battery voltage of each operation station and the operation state can be continued, that is, a time in which the battery voltage is lowered to the operation stop voltage, is different between the operation states.

Since the battery remaining amount used in this embodiment is a determination criterion indicating whether the own station performs communication with the base station, particularly an upstream communication information transmission (including a transmission of a transmission request of downstream communication information) or requests other station to relay, a time in which a state for transmitting the upstream communication information can be continued can be used as a measure of the battery remaining amount.

When a plurality of communication terminals including the own station have the same operation stop voltage, the battery remaining amounts of the communication terminals can be easily compared using a voltage as the measure. However, when battery characteristics or operation stop voltages of the plurality of communication terminals are different, the battery remaining amounts are suitably compared using a time in which the transmission state can be continued as the measure.

FIG. 7 is a view showing an example of a voltage curve by a load of a communication terminal. In FIG. 7 like FIG. 6, the vertical axis is a voltage and the horizontal axis is a time.

In FIG. 7, a voltage is dropped by the communication terminal load, that is, the consumption current variation. For this reason, the battery voltage is varied by setting of transmission power.

FIG. 8 is a view schematically showing a consumption power distribution with a bar graph.

The consumption power of the communication terminal is lowest in a state in which power is ON but any transmission or reception is not performed, the consumption power in a state in which the reception is performed, the consumption power in a state in which the wireless LAN is activated in addition to the reception, and subsequently the consumption power in a state in which upstream communication information is transmitted to the base station in addition to the reception and wireless LAN activation are highest.

The consumption power required to transmit the upstream communication information to the base station also depends on a transmission power, and the consumption power increases as the transmission power increases.

FIG. 9 is a view showing a curve of consumption power to transmission power setting.

From FIG. 9, it can be seen that the consumption power increases as the transmission power increases.

FIG. 10 is a view showing a relationship between a transmission power and a voltage drop.

As described above, the consumption power increases as the transmission power increases and the battery voltage is dropped as a current output from the battery increases.

This drop is continued in a time in which the current is larger, that is, a period in which transmission is performed at larger transmission power. When the transmission is terminated, the voltage drop due to the current is mitigated and the return to the original voltage before transmission is made (a voltage drop due to power consumed due to the transmission is present). The operations are shown in FIG. 7.

From the operations, a threshold value is compensated with an output to be transmitted when a measure of the battery remaining amount is set to a voltage (the compensation is made by subtracting the voltage drop value of FIG. 10 from the threshold value).

On the other hand, when a time in which a transmission state can be continued is set to the measure, the influence of a consumption current based on a transmission power of FIG. 9 to a continuation time needs to be reflected in the measure. Specifically, a time in which the consumption power based on the transmission power at a point of time of determining the battery remaining amount can be continued is set to the battery remaining amount.

The base station 3 can add a header indicating a communication terminal destination to downstream traffic data when transmitting the downstream traffic data directed to the communication terminal on the basis of scheduling. Since the communication terminal knows that a downstream data request corresponding to downstream traffic data to be received is a request of the communication terminal, an overhead increase in the traffic data can be avoided without adding the header.

Each communication terminal can transmit the downstream traffic data received from the base station 3 to a communication terminal using the wireless LAN or the like, and the communication terminal can receive the downstream traffic data on the wireless LAN.

In this case, the base station 3 performs scheduling, but scheduling is performed on the basis of a proportional pair algorithm described below.

For all communication terminals communicating with the base station 3, the base station 3 stores an average $Ri(n)$ of latest assignment communication speeds and updates it at a predetermined transmission timing (every 1/600 sec).

$$Ri(n)=(1-1/tc) \times Ri(n-1)+1/tc \times ri(n-1), \quad \text{(Numerical Expression 1)}$$

where $Ri(n)$ represents an average data communication speed in a slot n for a communication terminal i, and $ri(n)$ represents a transmission data communication speed in the slot n for the communication terminal i and is set to 0 when downstream traffic is not assigned to the communication terminal i. Moreover, $tc(i)$ represents a time constant.

The base station 3 computes the following evaluation function in a time n of the communication terminal i.

$$Fi(n)=DRCi(n)/Ri(n), \quad \text{(Numerical Expression 2)}$$

where $DRCi(n)$ represents a request data communication speed in the slot n of the communication terminal i, and a receivable downstream communication speed to be transmitted to the base station computed by the communication terminal.

The base station 3 evaluates $Fi(n)$ of each communication terminal at each transmission timing (every 1/600 sec), and assigns downstream traffic data to the communication terminal in which $Fi(n)$ is maximum.

In a process for computing the above-described evaluation expression, $ri(n)$ is set to an actually transmitted communication speed when the communication terminal i (communication terminal 1) directly communicates with the base station 3. However, when the communication terminal i communicates using a communication terminal j (communication terminal 2) as a relay station and the downstream traffic from the base station 3 is actually assigned to the communication terminal j, rj(n)=0 and ri(n) is a communication speed actually transmitted to the communication terminal j (in the prior art, ri(n)=0 and rj(n) is an actually transmitted communication speed).

ri(n)=0, rj(n) is a communication speed actually transmitted to the communication terminal j, and the following relationship is made.

$$Ri(n)=(1-1/tc)\times Ri(n-1)+1/tc\times rj(n-1),\quad\text{(Numerical Expression 3)}$$

$$Rj(n)=(1-1/tc)\times Rj(n-1)+1/tc\times rj(n-1)$$

The following correction is added to the computation of Ri(n).

At a time point of n−1, the communication terminal i communicates with the base station using the communication terminal j as the relay station. When downstream traffic is assigned from the base station 3 to the communication terminal j, the following relationship is made.

$$Ri(n)=(1-1/tc)\times Ri(n-1)+1/tc\times rj(n-1)\times(1+c)\quad\text{(Numerical Expression 4)}$$

$$Rj(n)=(1-1/tc)\times Rj(n-1)+1/tc\times rj(n-1)\times(-c),$$

In this regard, c represents a correction coefficient and its value is set to about 0.1 to 0.5.

That is, an average data speed of the communication terminal i obtained through relaying in the communication terminal j is incremented by the correction coefficient c, and an average data speed of the communication terminal 2 is decremented by c, such that the communication terminal 2 has an advantage over the communication terminal 1 in the subsequent evaluation function computation. In a similar correction computation, a method for offsetting an evaluation function (decreasing Fi(n) of the communication terminal i and increasing Fj(n) of the communication terminal j) or the like is also possible.

According to the above-described scheduling method, a structure in which a relaying communication terminal is not unfavorably treated and also a disadvantage for power consumption or the like is compensated for on scheduling can be introduced.

A communication terminal making a relay request of downstream communication information (traffic data) (the communication terminal 1 of the own station of FIG. 1) does not necessarily need to be provided with the relay execution section for relaying the downstream communication information (traffic data) to a surrounding communication terminal.

Moreover, a communication terminal relaying downstream communication information (traffic data) (the communication terminal 2 of the other station of FIG. 1) does not necessarily need to be provided with the relay request section for making a relay request of the downstream communication information (traffic data).

In particular, when the transmission power and the power supply capacity is sufficiently large as in an automobile telephone, a problem is small in terms of consumption power even when downstream communication information (traffic data) is relayed to a surrounding communication terminal. For this reason, when the automobile telephone is considered and used as a movable relay station, high-quality information communication can be realized without providing a new base station.

Hereinafter, a communication terminal and a mobile communication system according to another embodiment of the present invention will be described with reference to the drawings. An overall configuration of the system will be described with reference to FIG. 11.

Figure 11:
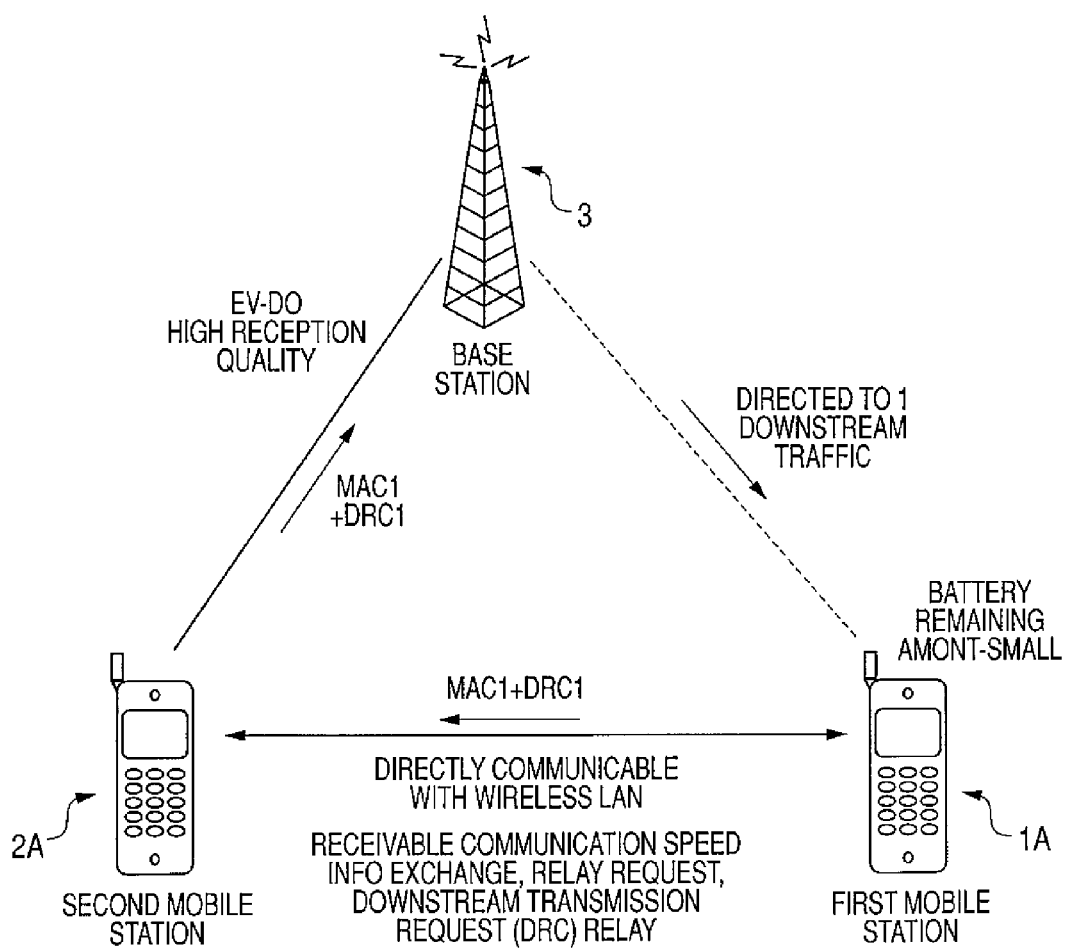
FIG. 11 is a view showing a positional relationship of a base station and a communication terminal.

FIG. 11 is a view showing a positional relationship of a base station 3, a mobile communication terminal (hereinafter, referred to as communication terminal) of an own station, and a communication terminal of other station.

A large difference from FIG. 1 is that the other station is configured to relay both upstream communication information and downstream communication information between the own station and the base station when the communication terminal serving as the own station makes a relay request to the communication terminal serving as the other station in FIG. 1, but the downstream communication information is directly transmitted from the base station and is received to the own station without passing though the other station by relaying only upstream communication information in the other station in FIG. 11.

The configurations of a communication terminal 1A and a base station 3 shown in FIG. 11 are the same as in FIG. 2, and their detailed description is omitted.

Figure 12:
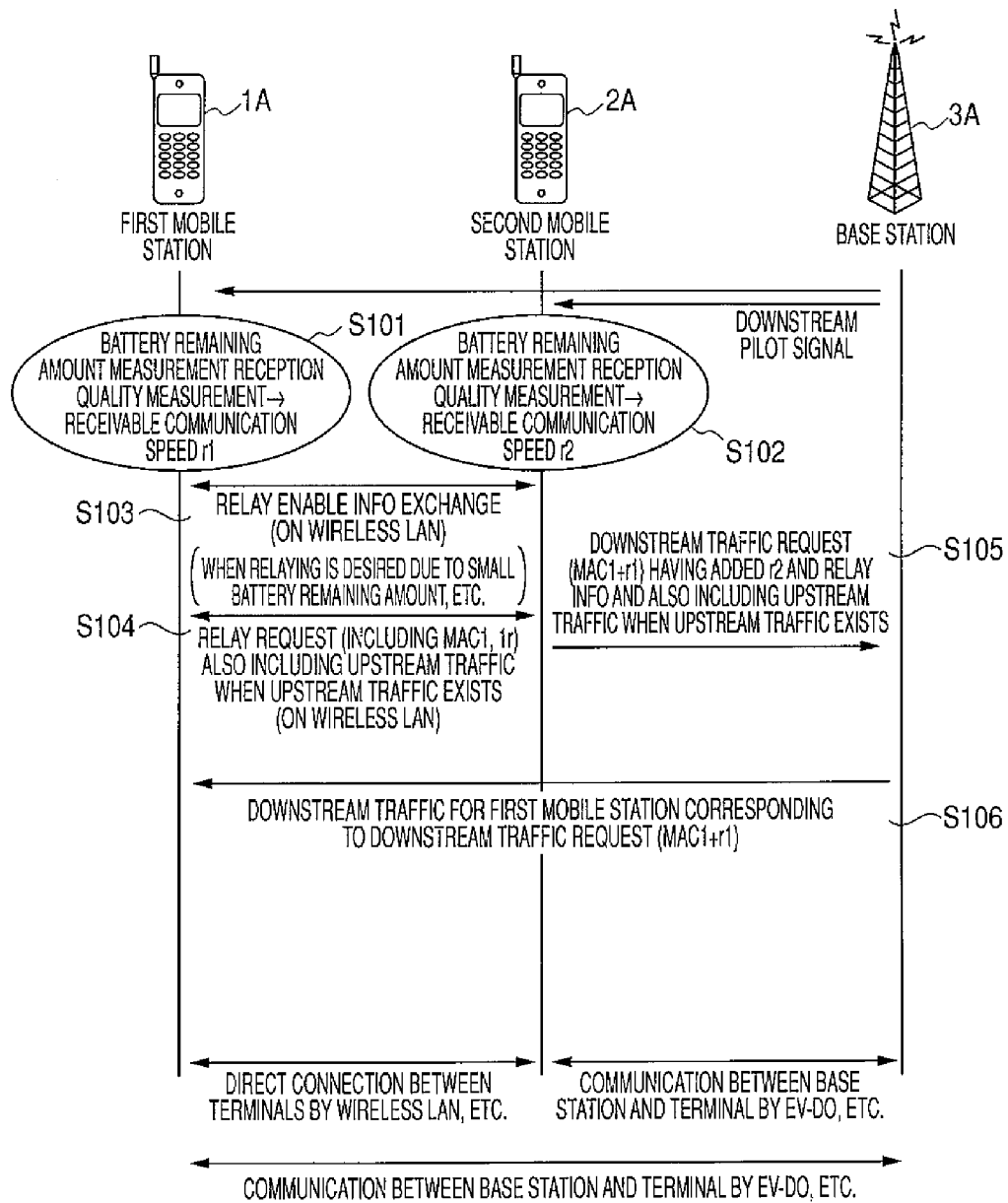
FIG. 12 is a view showing a communication operation between stations.

FIG. 12 is a view showing a communication operation between stations. Hereinafter, a communication operation among two communication terminals 1A, 2A and a base station 3 will be described with reference to FIG. 12. Herein, it is described that the communication terminal 1A of an own station is a state in which downstream traffic data needs to be received from the base station 3, the communication terminal 2A of an other station is located within a communication area of the base station 3, but the communication terminal 2A itself is in a state in which downstream traffic data does not need to be received.

First, the communication terminal 1A receives a downstream pilot signal from the base station 3, measure a reception state, compute a receivable downstream communication speed r1, and measure a battery remaining amount (step S101).

Then, the communication terminal 2A also receives a downstream pilot signal from the base station 3, measures a reception state, computes a receivable downstream communication speed r2, and measures a battery remaining amount (step S102). Then, the communication terminal 1A and the communication terminal 2A basically mutually exchange relay enable information including the receivable downstream communication speeds r1, r2, and the battery remaining amounts, but only the relay enable information of the other station is received from the communication terminal 2A without transmitting the relay enable information of the own station to the communication terminal 2A since the communication terminal 1A is not in a state in which relaying is possible (step s103).

When the communication terminal 1A determines that the battery remaining amount is less than a threshold value, a relay request including a MAC address (identification information) of the communication terminal 1A and the receivable downstream communication speed r1 is sent from the communication terminal 1A to the communication terminal 2A (step S104).

When receiving the relay request from the communication terminal 1A, the communication terminal 2A transmits, to the base station 3, a downstream communication information request of the own station including r2, and a downstream communication information request to which the MAC address of the communication terminal 1A and r1 included in the relay request from the communication terminal 1A are added (step S105).

The base station 3 determines a communication terminal to which the downstream communication information is transmitted by a scheduler 31. When the communication terminal 1A is selected, the downstream communication information directed to the communication terminal 1A is transmitted to the communication terminal 1A at the downstream communication speed r1 (step S106). At this time, if the base station 3 selects the communication terminal 2A, the downstream communication information directed to the communication terminal 2A is transmitted to the communication terminal 2A at the downstream communication speed r2.

Next, details of an internal processing operation of the communication terminal 1A will be described with reference to FIG. 13.

Figure 13:
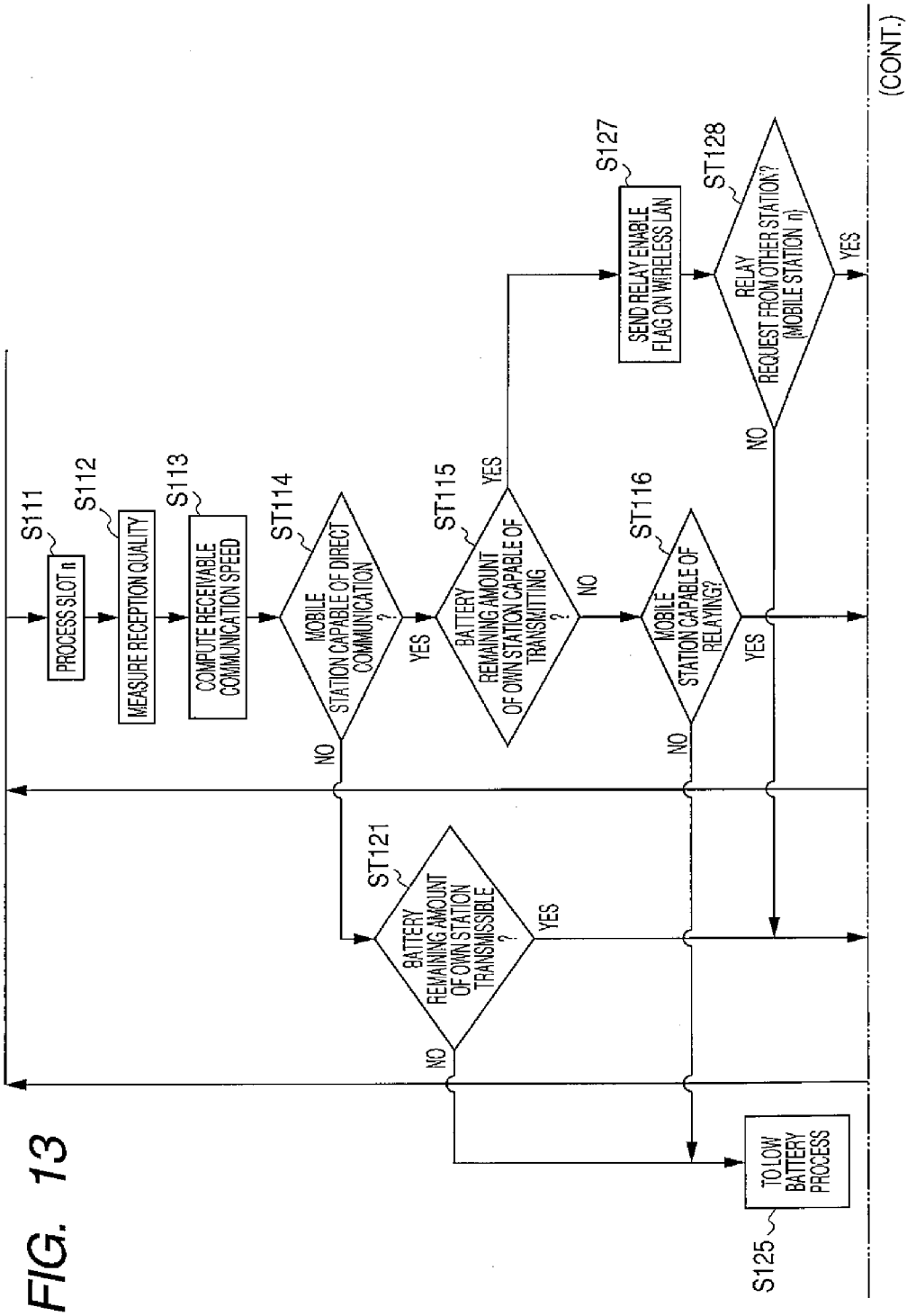

FIG. 13 is a flowchart showing the operation of the communication terminal 1A. The flowchart shown in FIG. 13 shows a processing operation when the communication terminal 1A is provided with both relay request section and relay execution section.

First, a process of a slot n is initiated in the communication terminal 1A (step S111). According to a downstream pilot signal from the base station 3, the communication terminal 1A measures a reception state (step S112) and computes a receivable downstream communication speed (step S113).

Next, the communication terminal 1A determines whether the communication terminal 2A of another station capable of direct communication by the wireless LAN exists (step S114).

Upon determining that no communication terminal 2A of the other station capable of direct communication by the wireless LAN exists in step S114, the battery remaining amount of the communication terminal 1A serving as the own station is measured and the threshold value is computed according to the reception state and the transmission power determined according to the control from the base station, and it is determined whether the transmission by the own station is possible by comparing the battery remaining amount and the threshold value (step S121).

Since other station capable of being requested to relay is not present upon determining that the transmission by the own station is impossible in step S121, it is no more possible to communicate with the base station and the transition to a low battery process (step S125) is made.

Upon determining that the transmission by the own station is possible in step S121, receivable downstream communication speed information is included and transmitted to the base station 3 and a request for transmission of downstream traffic data (communication information directed to the own station) is made (step S122).

Then, when the downstream traffic data is assigned, the downstream traffic data is received from the base station 3 (steps S123, S124) and the return to the first step S111 is made. Even when the downstream traffic data is not assigned, the return to the first step S111 is made.

On the other hand, upon determining that the communication terminal 2A of the other station capable of direct communication by the wireless LAN exists in step S114, the communication terminal 1A measures the battery remaining amount of the own station and computes the threshold value according to the reception state and the transmission power determined by the control from the base station, and determines whether the transmission by the own station is possible by comparing the battery remaining amount and the threshold value (step S115).

Upon determining that the transmission by the own station is impossible in step S115, it is determined whether the communication terminal 2A capable of relaying exists (step S116).

When a plurality of communication terminals capable of relaying exist, a communication terminal to be requested to relay can be selected by a battery remaining amount included in a relay enable flag, and can be randomly selected. Upon determining that the communication terminal 2A capable of relaying is absent in step S116, the transition to the low battery process (step S125) is made.

Upon determining that the communication terminal 2A capable of relaying exists in step S116, the communication terminal 1A sends a relay request including a MAC address of the own station on the wireless LAN and a receivable downstream communication speed r1 to the communication terminal 2A capable of relaying on the wireless LAN (step S118), and the transition to step S123 is made.

On the other hand, upon determining that the transmission by the own station is possible in step S115, the relay enable flag including the battery remaining amount is transmitted to the communication terminal 2A on the wireless LAN (step S127). Then, it is determined whether a relay request from a communication terminal n of other station (other station requesting the own station to relay) exists (step S128). When no relay request exists, the transition to step S122 is made.

When the relay request exists, receivable downstream communication speed information of the own station is included and transmitted to the base station 3, a request of transmission of downstream traffic data (communication information directed to the own station) is made, and a transmission request of downstream communication information directed to the communication terminal n to which relay information including a MAC address serving as identification information of the communication terminal n and a receivable communication speed rn included in the relay request are added is transmitted to the base station 3 (step S129), and the transition to step S123 is made.

When the communication terminal 1A receives the relay request of other communication terminal n, the communication terminal needs to transmit a downstream communication information transmission request of the own station and a downstream communication information transmission request of the communication terminal n, but it is preferable that the downstream communication information transmission request is transmitted as information of at most 10 bits or so shown in FIG. 5 to the base station, and is transmitted on an upstream traffic data channel or an access channel from the communication terminal 1A to the base station 3. Downstream communication information transmission requests of communication terminals of a plurality of other stations can be simultaneously transmitted to the base station 3. An increase in consumption power does not almost occur in comparison with the case where the downstream communication information transmission request is transmitted to the base station.

When a relay request is sent to the other station in step S118 in FIG. 13 in a further another embodiment of the present invention, a configuration can be made in which the receivable downstream communication speed of the own station and the receivable downstream communication speed of the other station to be requested to relay are compared, a request is made to transmit downstream communication information directed to the own station from the base station 3 when the receivable downstream communication speed of the own station is higher, and a request for relaying of the downstream communication information is made to the other station when the receivable downstream communication speed of the other station is higher and the other station can relay the downstream communication information.

Figure 14:
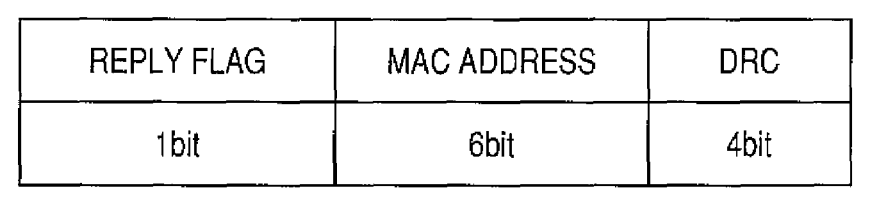

FIG. 14 shows an example of a downstream communication information transmission request to which a bit indicating the presence or absence of a relay request of downstream communication information to be transmitted to another station to which a relay request is made from the own station on the wireless LAN is added.

When a relay flag bit added to FIG. 5 is 0, it means that the own station directly receives downstream communication information directed to the own station from the base station 3. In the case of 1, it means that a relay request of downstream communication information is also made to the other station to be requested to relay. In this case, a relay enable flag to be transmitted by a communication terminal capable of relaying includes information of whether the downstream communication information can be relayed and information of a receivable communication speed or the like.

In a still further another embodiment of the present invention, a plurality of communication terminals located in a range in where direct communication by the wireless LAN or the like is possible mutually transmit and share relay enable information on the wireless LAN, irrespective of the battery remaining amount of the own station, and downstream communication information transmission requests of a plurality of communication terminals including a communication terminal incapable of relaying are relayed and transmitted to the base station through only at least one communication terminal or a small number of communication terminals among communication terminals capable of relaying.

The configuration of each communication terminal is the same as shown in FIG. 2, and its operation is the same as shown in FIGS. 11 and 12. Communication terminals configure a local network with direct communication section of the wireless LAN or the like, and share a list of a plurality of communication terminals located within the network. One specific communication terminal serves as a host and one communication terminal or a small number of communication terminals for performing relaying are determined, such that a communication terminal other than a relaying communication terminal requests the relaying communication terminal to relay a downstream communication information transmission request.

As a method for determining a relaying communication terminal, one terminal having a largest battery remaining amount is selected or top several terminals are selected according to the number of terminals to be requested to relay. Without comparing the battery remaining amounts, a communication terminal performing sequential relaying among a plurality of communication terminals capable of relaying can be assigned and a communication terminal randomly performing relaying can be selected from a plurality of communication terminals capable of relaying.

According to this configuration, battery consumption of all of a plurality of communication terminals located in a range in which mutual communication is possible can be reduced.

The communication terminal (mobile communication terminal) in the above embodiment of the present invention has been exemplarily described, but the communication terminal includes a portable telephone, a mobile terminal, a PDA (Personal Digital Assistance), and the like.

According to this embodiment as described above, communication terminals 1, 2 mutually perform wireless communication between an own station and another station and request a base station 3 to transmit communication information computed according to a reception state of the own station, such that it is possible to perform transmission power control. In the case of less than a relay request setting value computed from a battery remaining amount of the own station and transmission power setting, a relay request is made to the other station and communication information directed to the own station is received via the other station.

Accordingly, the communication information directed to the own station can be received from the base station 3 through transmission from the other station capable of relaying by setting the communication terminal of the other station to a relay station among a plurality of communication terminals located in a range in which mutual communication is possible. Accordingly, the user's convenience can be enhanced and the reduction of a communication time of a corresponding own station or the like due to a decrease in the battery remaining amount can be improved.

According to this embodiment, identification information for the base station 3 to identify any of an own station or another station is transmitted to the base station 3 via the other station, and communication information directed to the own station transmitted from the base station 3 on the basis of the identification information of the own station is received via the other station.

Accordingly, the communication terminal can acquire the communication information directed to the own station from the base station on the basis of the identification information of the own station.

According to this embodiment, the own station notifies the other station that the own station can relay when communication information directed to the own station is not provided, and communication information directed to the other station transmitted from the base station 3 on the basis of the identification information of the other station is relayed and transmitted to the other station when the other station requires relaying.

Accordingly, the communication terminal not only can request the other station to relay, but also can perform relaying for the other station.

A mobile communication system of this embodiment has a plurality of communication terminals 1, 2 for performing mutual wireless communication between an own station and another station and a base station 3 that is requested to transmit downstream communication information according to a reception state of the communication terminal. The communication terminal has an other-station relay request function for requesting other station to relay communication information directed to the own station by receiving a relay enable flag and a battery remaining amount transmitted and obtained from the other station, and transmitting identification information to be used for the base station to identify any of an own station or other station to other station having the largest battery remaining amount. The base station 3 has an own/other-station identification transmission function for transmitting communication directed to the own station to the communication terminal of the own station via the communication terminal of the other station on the basis of the identification information of the own station.

Accordingly, a relay station having a longest relay time can receive communication information directed to the own station from the base station by setting a communication terminal having the largest battery remaining amount to a relay station among a plurality of communication terminals capable of relaying in a range in which mutual communication is possible.

According to this embodiment, the base station 3 has a scheduling function for determining a transmission sequence and a transmission amount of communication information to the communication terminal on the basis of communication speed to a past communication amount of the communication terminal, and a communication amount correction function for handling communication information transmitted to a communication terminal having relayed as that transmitted to the communication having requested relaying.

Accordingly, since the communication terminal having relayed is not unfavorably treated, the user positively input power of the communication terminal even when the communication terminal is not used, such that the overall sum throughput can be improved as viewed from the base station and the use efficiency of radio equipment can be raised.

The communication amount correction function subtracts a communication amount according to the communication information transmitted to the communication terminal having relayed from a past communication amount of the communication terminal having relayed, and adds the communication amount to a past communication amount of the communication terminal having requested relaying.

Accordingly, since the communication amount according to communication information transmitted to the communication terminal having relayed is subtracted from the past communication amount of the communication terminal having relayed, the communication terminal having relayed can be favorably treated on its own scheduling by relaying, such that the user positively input power of the communication terminal even when the communication terminal is not used, such that the overall sum throughput can be improved as viewed from the base station and the use efficiency of radio equipment can be raised.

Communication terminals of this embodiment can perform mutually perform wireless communication between an own station and other station, transmit a transmission request of communication information directed to the own station via the other station, and request the other station to relay a transmission request serving as an upstream signal when a battery remaining amount of the own station is less than a threshold value in which a direct transmission to the base station 3 is possible, such that a decrease in a communication time of the own station due to a decrease in the battery remaining amount or the like can be improved without performing an upstream signal transmission to the base station for which a battery consumption amount is large.

Communication terminals of this embodiment can perform mutually perform wireless communication between an own station and another station, transmit a transmission request of downstream communication information directed to the own station via the other station, receive the downstream communication information directed to the own station via the other station, and requests the other station capable of relaying to relay a transmission request of the downstream communication information directed to the own station when the battery remaining amount of the own station is small, such that a decrease in a communication time of the own station due to a decrease in the battery remaining amount or the like can be improved. Among the own station and other stations capable of relaying, a side having a high reception state is set to a path of downstream communication information. That is, when the reception state of the own station is good, the own station directly receives the downstream communication information from the base station. When a communication terminal whose reception state is better than that of the own station exists among the other stations capable of relaying, a communication terminal having the best reception state among the other stations capable of relaying is requested to relay the downstream communication information, such that the high throughput can be achieved and the user's convenience can be raised.

Communication terminals of this embodiment can perform mutually perform wireless communication between an own station and other station, transmit a transmission request of downstream communication information directed to the own station via other station, and relay a transmission request of downstream communication information directed to other station from the other station. Among a plurality of communication terminals located in a range in which mutual communication is possible, at least one communication terminal relays and transmits a transmission request of downstream communication information of the own station and a plurality of other stations to a base station. Since the plurality of other stations only make a relay request and do not transmit upstream communication information to the base station, the overall battery consumption of the plurality of communication terminals located in the range in which mutual communication is possible can be reduced.

A communicable time can be averaged for all the plurality of communication terminals by setting a communication terminal having a largest battery remaining amount to a relay station among the plurality of communication terminals.

The unfairness that only a battery remaining amount of a specific communication terminal in all the plurality of communication terminals is reduced can be avoided by randomly selecting a communication terminal serving as a relay station from among the plurality of communication terminal.

While the present invention has been described in detail with reference to certain embodiments, it will be understood by those skilled in the art that various changes and modifications may be made therein without departing from the spirit and scope of the present invention.

This application claims priority to Japanese Patent Application No. 2005-285658 filed on Sep. 29, 2005, the entire disclosure of which is hereby incorporated by reference.

The invention claimed is:

1. A communication terminal which is capable of performing first communication with a base station and second communication with other terminal, the communication terminal comprising:
   a detection section that detects a battery remaining amount, and
   a control section that selects either one of the first communication and the second communication to be performed based on the battery remaining amount, in response to the communication terminal receiving a downstream signal from the base station, and switches from the first communication to the second communication based on the selection wherein if the control section determines that the battery remaining amount in the communication terminal is less than a threshold value, the control section sends a relay request including a MAC address of the communication terminal to the second communication terminal.

2. A communication method of a communication terminal, which allows first communication with a base station and second communication with other terminal, the communication method comprising:
   detecting a battery remaining amount,
   selecting either one of the first communication and the second communication to be performed based on the batter remaining amount, in response to the communication terminal receiving a downstream signal from the base station, and switching from the first communication to the second communication based on the selection if it is determined that the battery remaining amount in the communication terminal is less than a threshold value, sending a relay request including a MAC address of the communication.

* * * * *